United States Patent
Chang et al.

(10) Patent No.: US 6,691,102 B2
(45) Date of Patent: Feb. 10, 2004

(54) QUERY PROCESSING METHOD OF NAME-VALUE PAIRS IN RELATIONAL DATABASES

(75) Inventors: Yuan-Chi Chang, Ossining, NY (US); Sriram Kolinjivadi Padmanabhan, Briarcliff Manor, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/106,941

(22) Filed: Mar. 26, 2002

(65) Prior Publication Data
US 2003/0187830 A1 Oct. 2, 2003

(51) Int. Cl.[7] .............................................. G06F 17/30

(52) U.S. Cl. ........................ 707/2; 707/1; 707/3; 707/10

(58) Field of Search ...................... 707/1–3, 10; 705/10, 705/27

(56) References Cited

U.S. PATENT DOCUMENTS

| | | | | |
|---|---|---|---|---|
| 5,600,831 A | * | 2/1997 | Levy et al. ..................... | 707/2 |
| 5,758,338 A | * | 5/1998 | Faloutsos et al. .............. | 707/6 |
| 5,960,423 A | * | 9/1999 | Chaudhuri et al. ............. | 707/2 |
| 6,353,826 B1 | * | 3/2002 | Seputis .......................... | 707/5 |
| 6,374,234 B1 | * | 4/2002 | Netz .............................. | 707/2 |
| 6,460,043 B1 | * | 10/2002 | Tabbara et al. ............... | 707/100 |

\* cited by examiner

*Primary Examiner*—Kim Vu
*Assistant Examiner*—Cam-Y Truong
(74) *Attorney, Agent, or Firm*—F. Chau & Associates, LLP

(57) ABSTRACT

Electronic marketplaces typically apply catalog schema in the format of name-value pairs to store product attribute names and values to achieve a very high degree of flexibility. This vertical schema approach prevents traditional relational database management systems from accurately estimating constraint selectivity and generating efficient query plans. In this invention, methods and systems are disclosed for building and maintaining external histograms and a query planner uses these external histograms to assist query planning in relational databases.

20 Claims, 8 Drawing Sheets

| SKU 400 | Attribute name | String value | Float value | Integer value |
|---|---|---|---|---|
| MN120P | Manufacturer | IBM | | |
| MN120P | Max. current | | 6.4 | |
| MN120P | Voltage | | 3.3 | |
| C2348 | Color | Red | | |
| C2348 | Collar size | | 15.5 | |
| C2348 | Material | Cotton | | |

Aggregated histogram

200 — SKU | Manufacturer | Max. current | Voltage
202 — MN120P | IBM | 6.4 | 3.3

SKU | Color | Collar size | Material
204 — C2348 | Red | 15.5 | Cotton

| SKU | Attribute name | String value 205 | Float value 206 | Integer value 207 |
|---|---|---|---|---|
| MN120P | Manufacturer | IBM | | |
| MN120P | Max. current | | 6.4 | |
| MN120P | Voltage | | 3.3 | |
| C2348 | Color | Red | | |
| C2348 | Collar size | | 15.5 | |
| C2348 | Material | Cotton | | |

FIG. 2

| SKU | Attribute name | String value | Float value | Integer value |
|---|---|---|---|---|
| MN120P | Manufacturer | IBM | | |
| MN120P | Max. current | | 6.4 | |
| MN120P | Voltage | | 3.3 | |
| C2348 | Color | Red | | |
| C2348 | Collar size | | 15.5 | |
| C2348 | Material | Cotton | | |

400

402

Aggregated histogram

QUERY PROCESSING METHOD OF NAME-VALUE PAIRS IN RELATIONAL DATABASES

FIELD OF THE INVENTION

The present invention relates generally to database systems and, more particularly, to methods for building an efficient query plan for vertical schema.

BACKGROUND OF THE INVENTION

The usage of relational databases traditionally requires careful analysis of the data to be stored in order to define and create a set of tables that can efficiently represent elements and their relations to the data. For example, a red T-shirt with collar size 15 and a half and made of cotton is a typical description of a shirt, and this information needs to be captured. When data about the T-shirt is mapped into relational schema, it is well known in the art to create a table for T-shirt data with columns for a stock-keeping unit (SKU) to uniquely identify this product, a column for color, a column for collar size, and a column for type of material. For the example T-shirt, a row is inserted into the table with red in the color column, the value 15 and a half in the collar size column, and cotton in the material column. The traditional schema layout is referred to as horizontal schema. The above steps require the knowledge of T-shirt data to be available at the schema layout stage to name tables and columns.

In an electronic marketplace, the products that are traded and sold can vary from day to day, and there may be no prior knowledge about certain products to follow the above steps to define and create horizontal schema. It is therefore popular among software vendors of electronic marketplaces to choose a schema-neutral format for their catalogs. The layout of these electronic catalogs are flexible to accommodate all kinds of products without the need to create separate tables for each product. This layout can be best described as 'name-value pairs' or vertical schema. In the vertical schema, conceptually, there are three columns: the first column to uniquely identify the product, the second column to record the name of the attribute, and the third column to record the value of the attribute. To store the T-shirt data in the vertical schema, three rows are used. For all three rows, the first column is the same to store the SKU of the T-shirt. The second column stores attribute names, such as color, collar size, and material. The third column stores attribute values matched to the second column, such as red (matched to color), 15 and a half (matched to collar size), and cotton (matched to material).

The flexibility of the vertical schema can be seen by using the same table to store a totally different product such as transistors. Transistors may have a manufacturer, current, and voltage as their attributes. Again, three rows can be inserted with the SKU of the transistor in the first column. One row can store the attribute 'Manufacturer' and its value 'IBM'; another row can store the attribute 'Current' and its value '6.4'; and the third row can store the attribute 'Voltage' and its value '3.3'. There is no need to create a second table to manage transistor data. In an electronic marketplace where a variety of products are traded daily, such high flexibility is desirable to avoid the burden of creating and managing individual product tables.

Certain aspects of the vertical schema were discussed in the paper by Agrawal et al. (R. Agrawal, A. Somani, and Y. Xu, "Storage and Querying of E-Commerce Data," Proceedings of the 27th International Conference on Very Large Data Bases, Rome, Italy, pp. 149–158, 2001). This paper did not address the query performance problem. It discussed the problem of 'hiding' the vertical schema from database users, who are more familiar with the traditional horizontal schema. The contribution of the paper is to propose an automated translator from queries written for the horizontal schema to queries written for the vertical schema. The present invention addresses the query processing issue of queries written for the vertical schema. It is adequate to say that the present invention and the above-mentioned paper by Agrawal et al. are targeted at different problems in the art.

A significant disadvantage of the vertical schema is its slow query performance. Thus, it would be desirable and highly advantageous to have methods for building efficient query plans for vertical schema.

SUMMARY OF THE INVENTION

The present invention offers methods to address the query processing issue by first observing two critical problems of optimizing query plans on the vertical schema. The first problem is inaccurate selectivity estimation; the second problem is inaccurate query cost and query plan selection based on inaccurate selectivity numbers. The novel method presented in the invention uses an external histogram and an external query planner to remedy these two problems.

According to a first aspect of the invention, there is provided a method for efficiently building a query plan for vertical schema. The method includes the step of receiving query information including at least one constraint. An external histogram is retrieved having information for name-value pairs of the vertical schema. Then, selectivity estimates are determined for at least one of the constrains using the external histogram. Finally, the query plan is generated using at least some of the selectivity estimates.

According to a second aspect of the invention, the method further includes the step of checking whether any of the constraints is a high selectivity constraint using the selectivity estimates. According to a third aspect of the invention, if there is a high selectivity constraint, it is used to drive a join operation. According to a fourth aspect of the invention, if there is no high selectivity constraint, separate queries are issued. According to a fifth aspect of the invention, the separate queries are joined in memory.

According to a sixth aspect of the invention, the vertical schema model information for an electronic catalog. According to a seventh aspect of the invention, each of the name-value pairs is associated with an attribute of a product and its value.

According to an eighth aspect of the invention, the method further includes the step of updating the external histogram with actual result size information. According to a ninth aspect of the invention, the actual result size information relates to at least one user query. According to a tenth aspect of the invention, the actual result size information relates to at least one query not issued by a user.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is a graphical illustration of exemplary horizontal and vertical schema as discussed in the present invention;

DETAILED DESCRIPTION OF PREFERRED EMBODIMENTS

Figure 1:
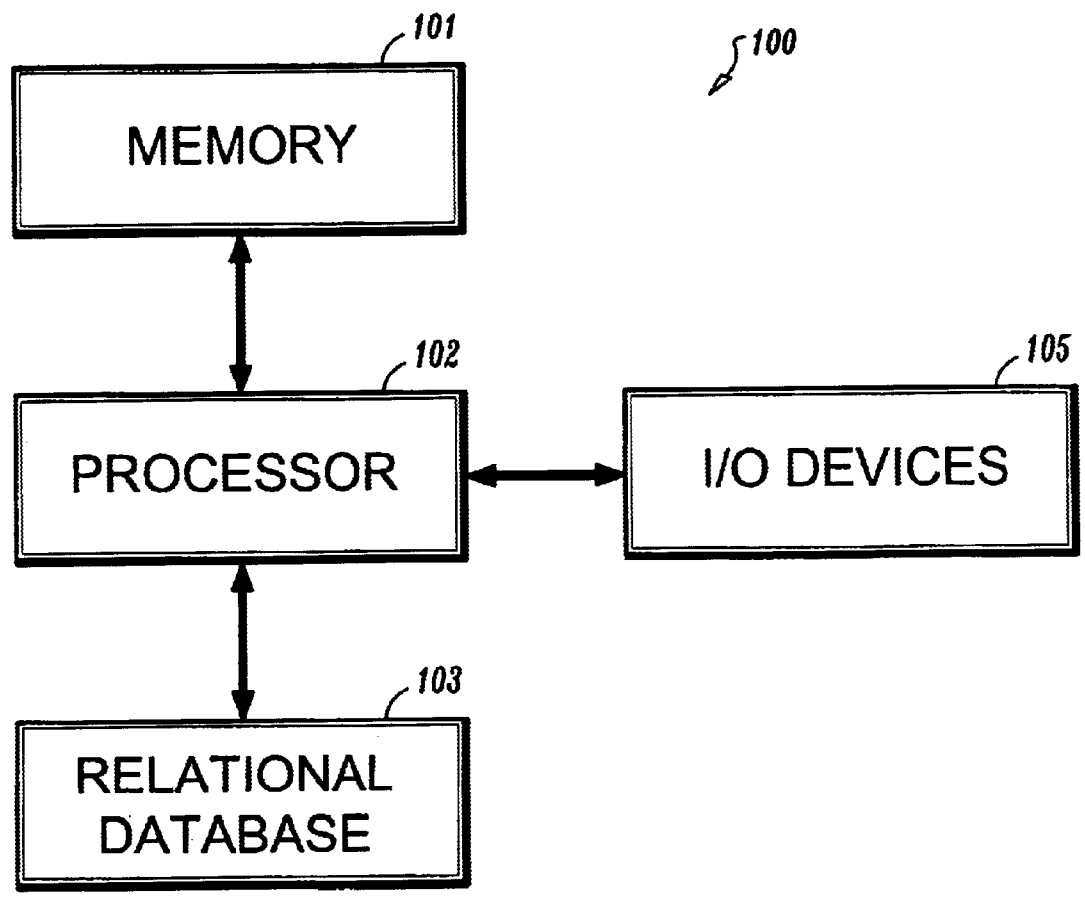
FIG. 1 is a block diagram of an exemplary hardware architecture for use with the methodologies of the invention.

First, an exemplary architecture for processing queries against vertical schema formed in accordance with the invention is described in the context of FIG. 1. The system 100 includes a processor 102 coupled to a memory 101, one or more input/output (I/O) devices 105, and a relational database store 103. It is to be appreciated that the processor 102 implements the flow diagrams shown in FIGS. 5, 6, and 7a–7b. The memory 101 is used by the processor 102 in performing, for example, storage of histograms and intermediate query results. The I/O devices 105 may include a keyboard, a mouse, and/or any other data input device which permits a user to enter queries and/or other data to the system 100. The I/O devices 105 may also include a display, a printer, and/or any other data output device which permits a user to observe results associated with queries and/or other processor operations. The relational database store 103 may contain structured data organized as name-value pairs, also known as the vertical schema. In such a configuration, the processor 102 can access the database store 103 in response to a user query.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., a keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

FIG. 2 illustrates a major difference between the traditional horizontal schema layout of structured data and the vertical schema layout of the same data applied in an electronic marketplace catalog. The tables 200 and 202 are examples of horizontal schema where attribute names are mapped into columns and their values are stored in the corresponding column cells. The table 204 illustrates how the heterogeneous data in tables 200 and 202 may be stored in one single table using the concept of name-value pairs. In table 204, attribute names are no longer mapped into columns. They are stored in column cells of the column named attribute name. The attribute values, depending on their data types, are stored in respective data-typed columns of the same row. For example, if an attribute value has a string data type, it is stored in the string value column 205. If it has a floating point data type, it is stored in the float value column 206. And, if an attribute value has an integer data value, it is stored in the integer value column 207. Note that a single row consisting of three attribute columns (excluding the SKU column) in table 200 are mapped into three rows in table 204.

Figure 3:
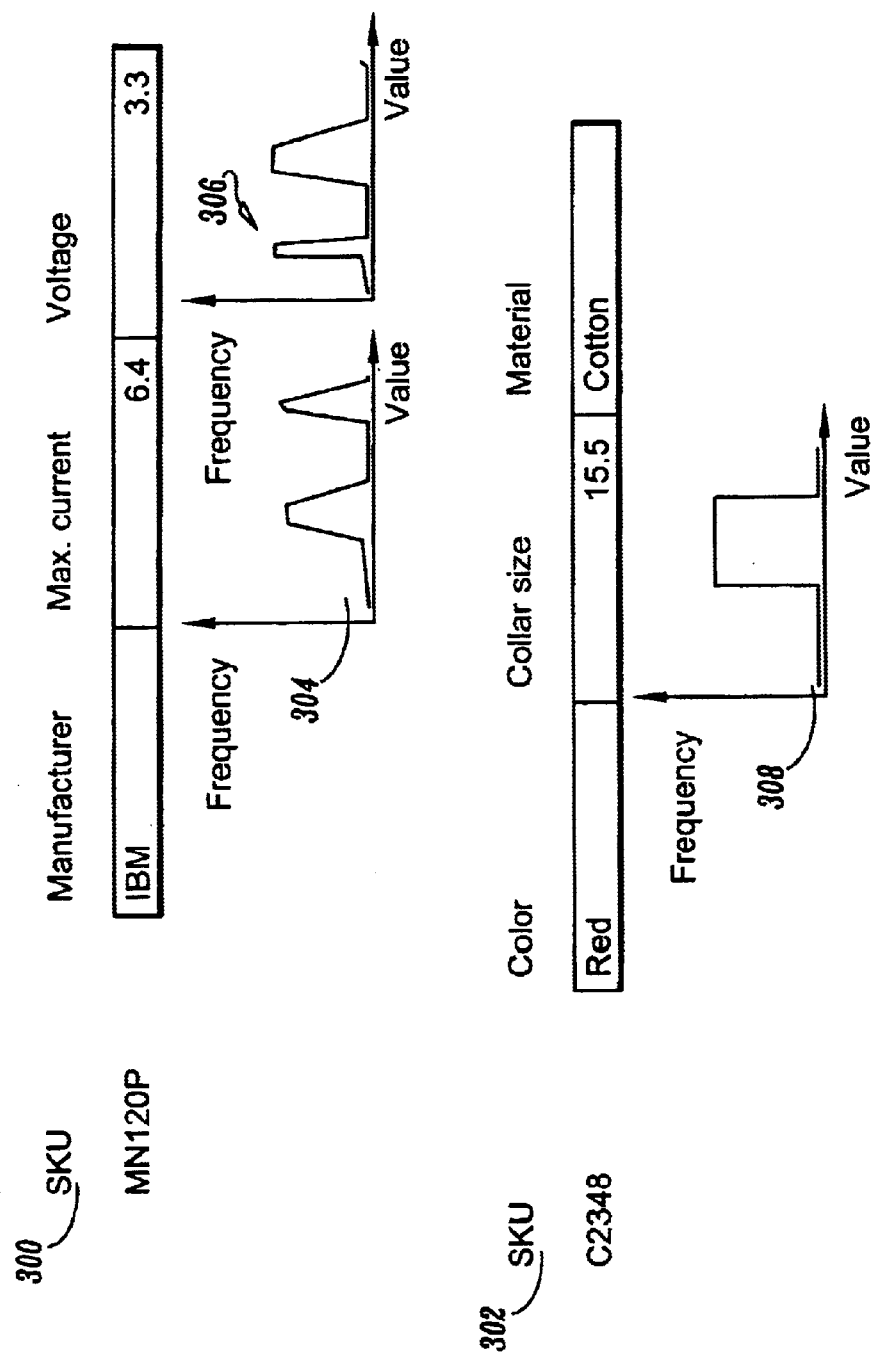
FIG. 3 is a graphical illustration of various exemplary conventional histograms for horizontal schema as discussed in the present invention.
Figure 4:
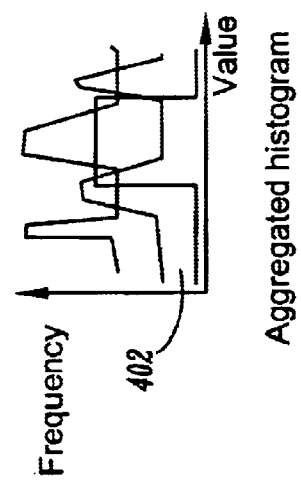
FIG. 4 is a graphical illustration of an exemplary conventional histogram for a vertical schema as discussed in the present invention.

FIG. 3 illustrates various exemplary histograms built for indexed columns by a relational database. The histograms 304, 306, and 308 are individual histograms built for attributes 'Max Current,' 'Voltage,' and 'Collar Size,' respectively. As is well known in the art, relational database management systems use histogram statistics to estimate query cost and choose the least expensive query plan to execute. FIG. 4 illustrates why using histogram statistics to estimate query cost and choose the least expensive query plan can be so difficult when vertical schema are used. Note that attribute values of the floating point data type are all stored in one column and the database has no knowledge that they belong to different attributes of different products. Therefore, when statistics are collected at this column to build a histogram, the final histogram 402 represents the aggregated distributions of three individual histograms 304, 306, and 308. The inaccurate histogram 402 leads to inaccurate selectivity estimates, which may cause query planning by the relational database query optimizer to be ineffective.

Figure 5:
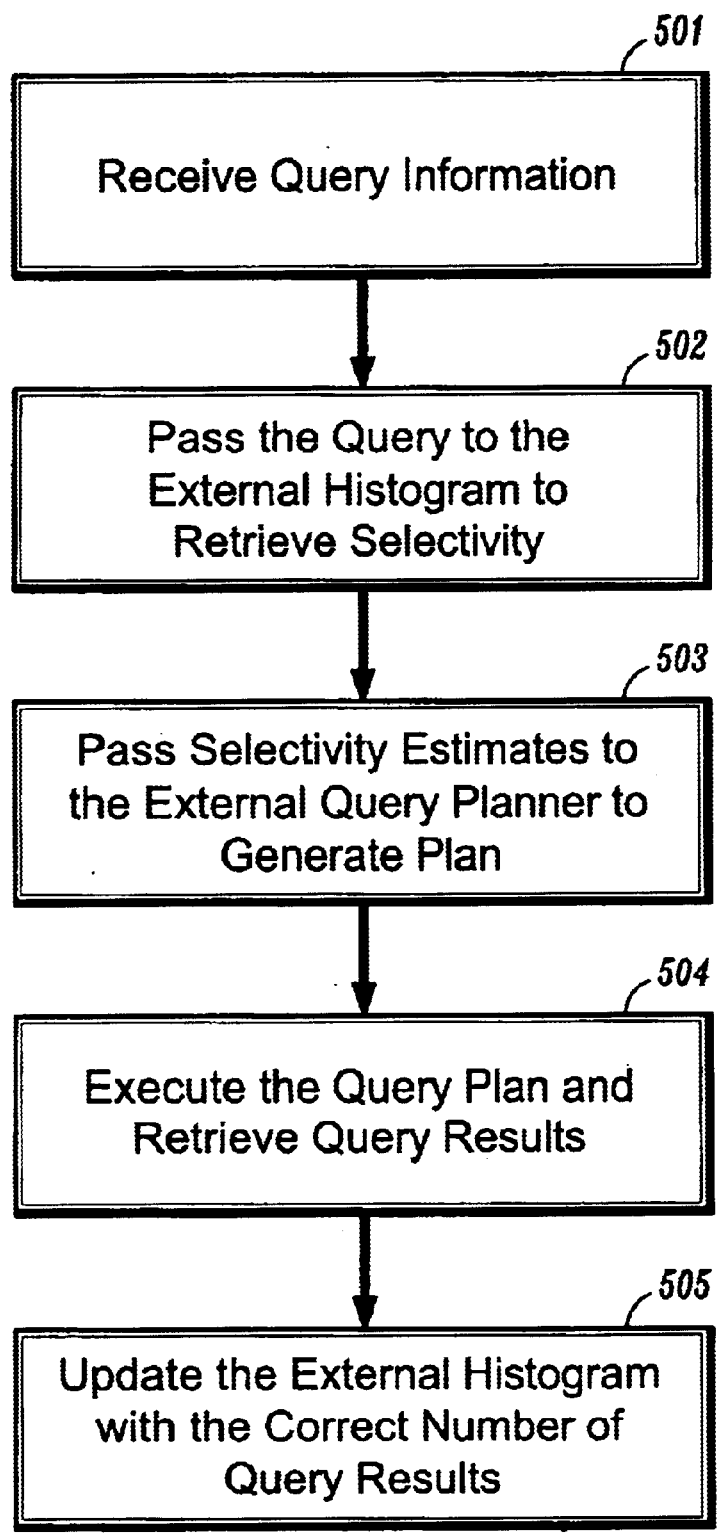
FIG. 5 is a flow diagram outlining query processing in accordance with an embodiment of the invention.

FIG. 5 is a flow diagram that outlines the steps of the query processing routine of the present invention. Here, we assume that a user query includes one or more constraints against structured data in a vertical schema and these constraints are logically ANDed. The routine starts at step 501 where query information is received. For example, the end user may have requested a list of SKU's for all white shirts with a collar size between 14 and 17. (Here, the constraints would be that the color of the shirts be white and the collar sizes of the shirts be within the range of 14 and 17). After the user query is received, control then passes to step 502 where an external histogram is retrieved and used to determine an estimate of the selectivity of each individual constraint as well as an estimate of the selectivity with all the constraints applied. (It should be appreciated that this external histogram is separate and distinct from the histograms conventionally built and maintained by various relational database management systems. A procedure to build the external histogram is detailed in FIGS. 7a–b). In the example, it may be determined that there are an estimated 1,000 white shirts and 3,000 shirts with collar sizes between 14 and 17. Once the selectivity estimates are determined, control passes to step 503 where the selectivity estimates are passed to the external query planner to generate an efficient query plan. (The external query planner is different from the database query optimizer. The algorithm of the external query planner is detailed in FIG. 6). Next, in step 504, the routine executes various queries according to the plan, and retrieves results from the relational database. Finally, in step 505, the external histogram is updated with the correct number of returns, which can be used to improve estimate precision of the histogram in future queries.

Figure 6:
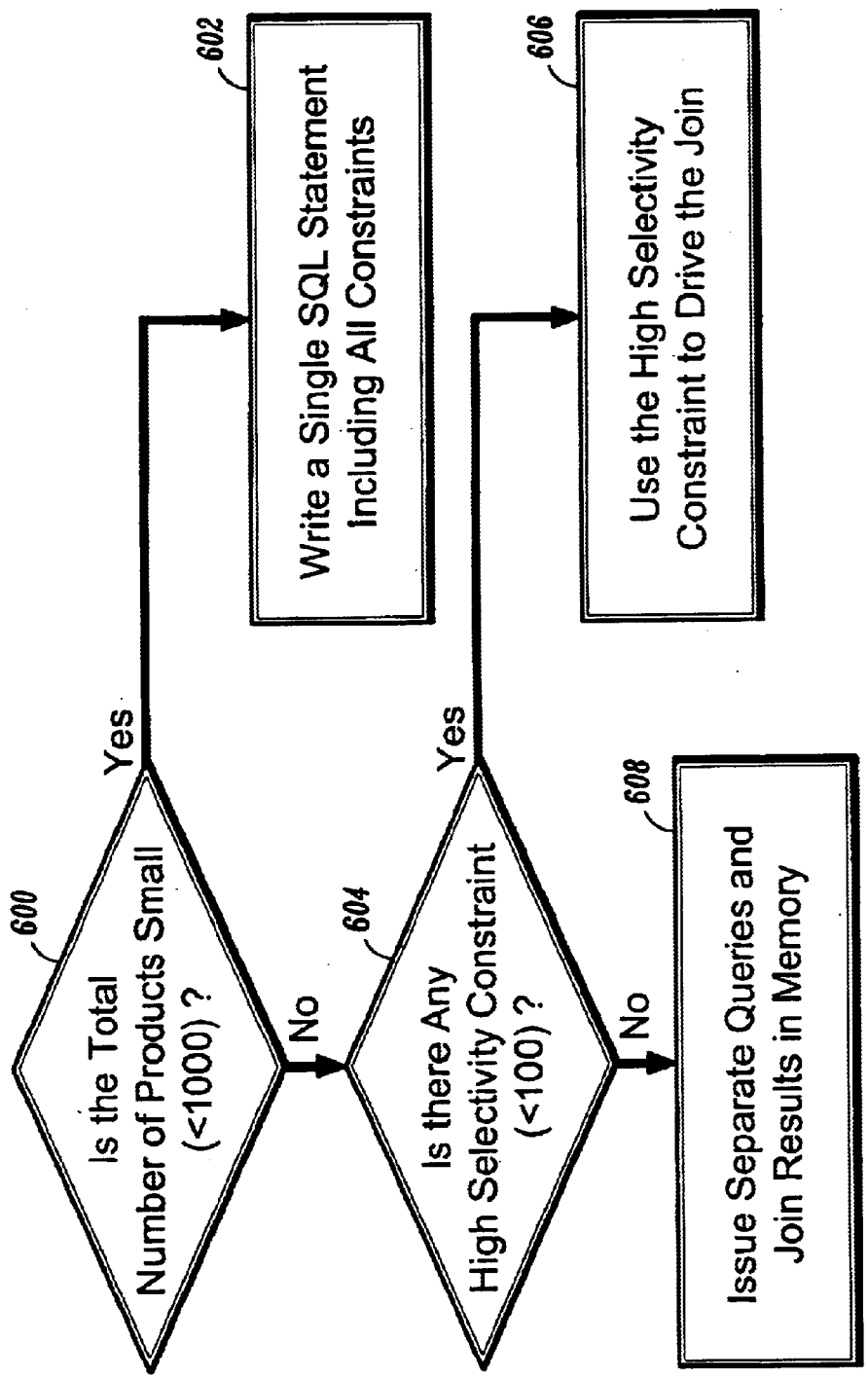
FIG. 6 is a flow diagram outlining the external query planner of FIG. 5 in accordance with an embodiment of the invention.
Figure 7A:
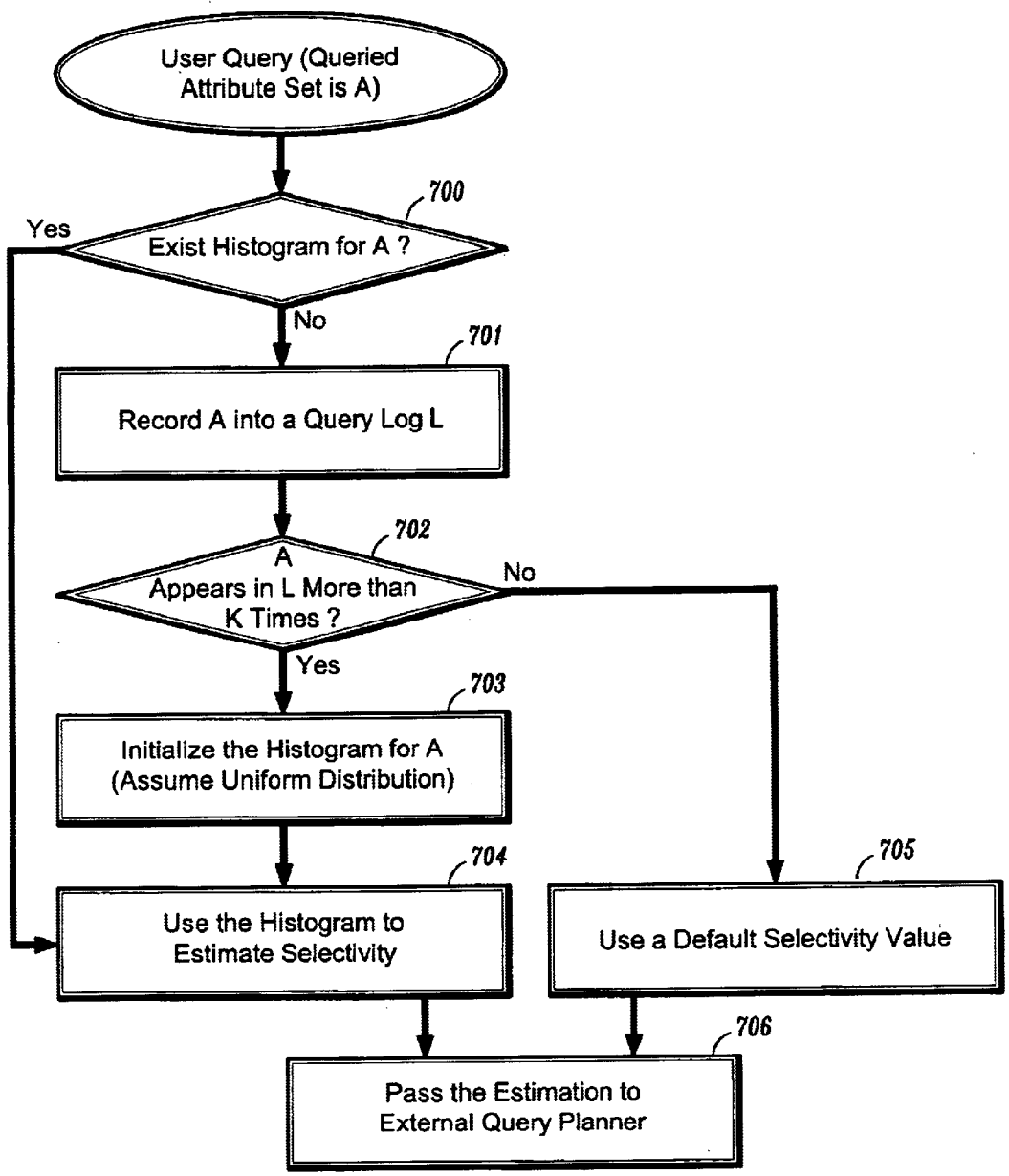
FIGS. 7a and 7b are flow diagrams outlining a routine for building the external histograms of FIG. 5 in accordance with an embodiment of the invention.
Figure 7B:
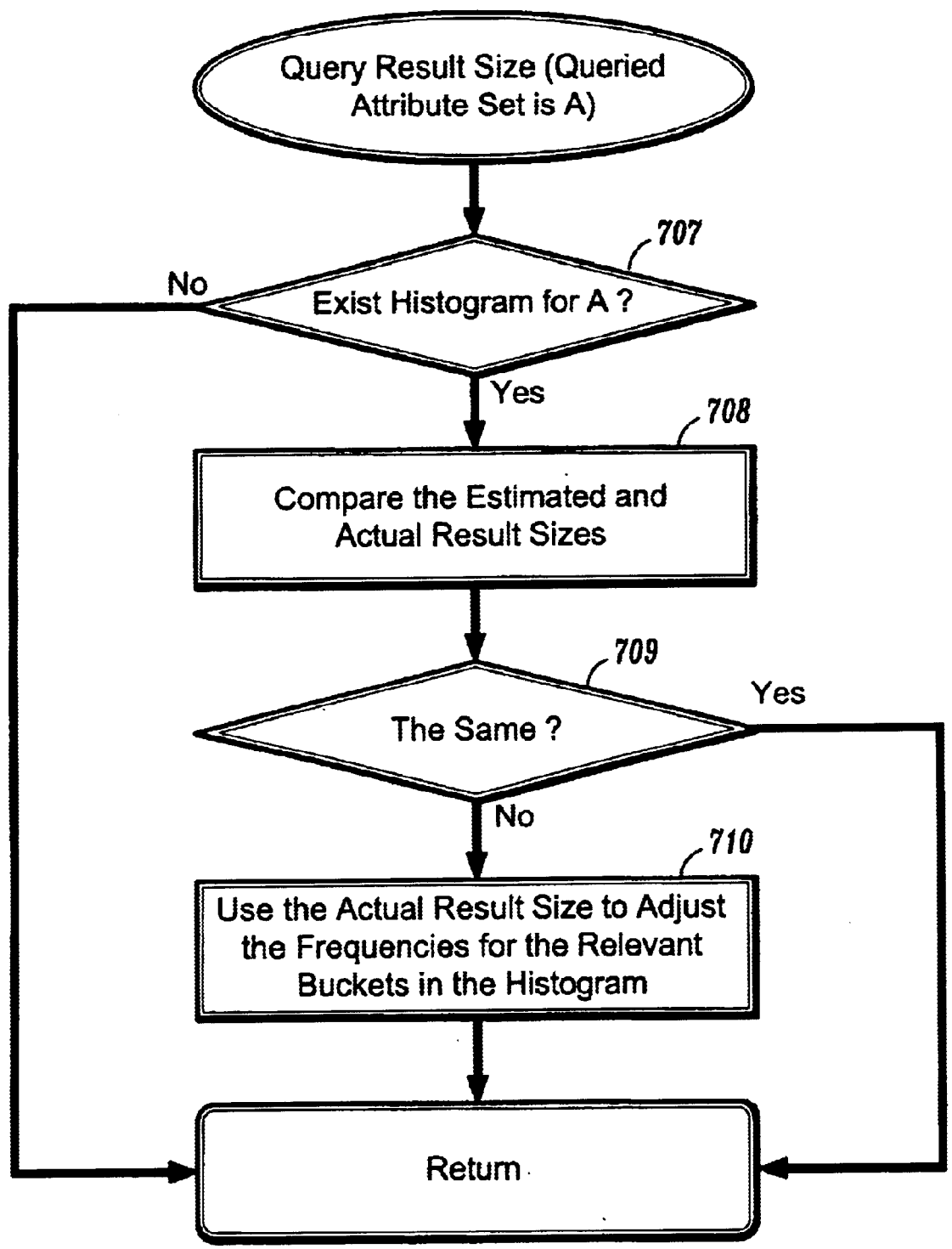

FIG. 6 is a flow diagram that outlines the operation of an external query planner, which accepts selectivity estimates and decides the best query execution plan. It should be noted that the external query planner may not be optimal for all relational database platforms. Disclosed is the best known art practiced by the inventors. It should be appreciated that various experiments and fine tuning according to specific settings and configurations of database stores may be performed by those skilled in the art without departing from the spirit and scope of the invention.

At step 601, a determination is made as to whether the total number of products in the database is relatively small and therefore can be executed by the database without help. If the answer is yes, then the external query planner, at step 602, outputs a single Structured Query Language (SQL) statement that includes all user-issued constraints. If, on the other hand, it is determined that the number of products is not relatively small, the external query planner next determines, in step 604, whether any of the constraints are expected to be highly selective. In general, a constraint is considered to be highly selective if it is expected that the constraint will yield relatively few rows. The highly selective constraint, when it is applied, is expected to drive the join operation to improve query performance. It is expected, however, that due to inaccurate internal histograms, a conventional relational database will not be able to pick up the high selectivity constraint. This is the occasion that the external histogram can help.

If a high selectivity constraint is found, at step 606, the external query planner can then issue two queries. The first query is to apply the high selectivity constraint to retrieve the Ids of products. The second query is to apply all other constraints with the output of the first query (i.e., a list of the Id's obtained as a result of the first query) included in the SQL clause IN. It is observed that the extra query can significantly reduce query execution time.

If none of the user issued constraints are highly selective, at step 608, the external query planner issues one SQL statement for each constraint and performs in-memory intersection of returned product Ids. Again it is observed that relational databases often take significantly longer to execute a single complex SQL statement with multiple constraints than multiple simple SQL statements each of which contains one constraint. At the expense of main memory usage, results of the multiple SQLs statements are joined together.

It should be appreciated that the function of the external query planner is not to replace the relational database query optimizer but to assist it by highlighting highly selective constraints or bypassing the expensive join operation.

FIG. 7(*a*) is a flow diagram that shows the procedure of building the external histograms. When a user issues a query that includes constraints on an attribute of a set A, at step 700, the list of existing external histograms are checked to see if there is a histogram H(A) associated with the set A. If so, at step 704, the method uses the histogram H(A) to estimate the selectivity for the user query and, at step 706, passes the estimation to the external query planner. If the histogram H(A) does not exist, at step 701, the set of attributes of the set A are assigned to a query log L. In step 702, the log L is then checked to determine how many times the set A appears in the log L. If it is determined that A appears in the log L more than K times (K is a tunable threshold value), at step 703, an external histogram H(A) associated with set A is built using a uniform distribution assumption to initialize the histogram H(A). At step 704, the histogram H(A) is then added to the list of existing external histograms and is used to estimate the selectivity of the user query. If the set A appears in the log L less than K times, at step 705, a default value is returned as the selectivity for the user query.

FIG. 7(*b*) is a flow diagram that shows free query feedbacks can be used to improve the accuracy of existing external histograms. When a query is executed, the method obtains the query result size at no extra cost. Assume the query consists of constraints on the attribute set A. At step 707, the existing histogram list is checked to see if the histogram H(A) exists. If so, at step 708, the method uses the histogram H(A) to estimate the result size of the query and compares it with the actual result size. If they are not the same, at step 710, the actual result size is used to adjust the frequencies for the relevant buckets of the histogram H(A).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for building an efficient query plan for vertical schema, comprising:

receiving query information including at least one constraint;

retrieving an external histogram having information for name-value pairs of the vertical schema;

determining selectivity estimates for the at least one constraint using the external histogram; and generating the query plan using at least some of the selectivity estimates;

wherein a row of the vertical schema comprises one of the name-value pairs.

2. The method of claim 1, wherein generating the query plan includes checking whether any of the at least one constraint is a high selectivity constraint using the selectivity estimates.

3. The method of claim 2, wherein generating the query plan includes using the high selectivity constraint to drive a join operation if any of the at least one constraint is a high selectivity constraint.

4. The method of claim 2, wherein generating the query plan includes issuing separate queries if none of the at least one constraint is a high selectivity constraint.

5. The method of claim 4, wherein results of the separate queries are joined in memory.

6. The method of claim 1, wherein the vertical schema model information for an electronic catalog.

7. The method of claim 1, wherein each of the name-value pairs is associated with an attribute of a product and its value.

8. The method of claim 1, further comprising updating the external histogram with actual result size information.

9. The method of claim 8, wherein the actual result size information relates to at least one user query.

10. The method of claim 8, wherein the actual result size information relates to at least one query not issued by a user.

11. A program storage device readable by a machine, tangibly embodying a program of instructions executable on the machine to perform method steps for building an efficient query plan for vertical schema, the method steps comprising:

receiving query information including at least one constraint;

retrieving an external histogram having information for name-value pairs of the vertical schema;

determining selectivity estimates for the at least one constraint using the external histogram; and generating the query plan using at least some of the selectivity estimates;

wherein a row of the vertical schema comprises one of the name-value pairs.

12. The program storage device of claim 11, wherein generating the query plan includes checking whether any of the at least one constraint is a high selectivity constraint using the selectivity estimates.

13. The program storage device of claim 12, wherein generating the query plan includes using the high selectivity constraint to drive a join operation if any of the at least one constraint is a high selectivity constraint.

14. The program storage device of claim 12, wherein generating the query plan includes issuing separate queries if none of the at least one constraint is a high selectivity constraint.

15. The program storage device of claim 14, wherein results of the separate queries are joined in memory.

16. The program storage device of claim 11, wherein the vertical schema model information for an electronic catalog.

17. The program storage device of claim 11, wherein each of the name-value pairs is associated with an attribute of a product and its value.

18. The program storage device of claim 11, further comprising updating the external histogram with actual result size information.

19. The method of claim 18, wherein the actual result size information relates to at least one user query.

20. The method of claim 18, wherein to actual result size information relates to at least one query not issued by a user.

* * * * *